United States Patent
Qie et al.

(10) Patent No.: US 12,058,130 B2
(45) Date of Patent: Aug. 6, 2024

(54) SYSTEMS AND METHODS FOR SECURE ONBOARDING AND COMMUNICATION FOR INTERNET OF THINGS DEVICES

(71) Applicant: Verizon Patent and Licensing Inc., Basking Ridge, NJ (US)

(72) Inventors: Wujun Qie, Needham, MA (US); Yagiz Onat Yazir, Hollis, NH (US); Adriana M. Rincon, Sudbury, MA (US); Ping Judy Gao, Newtonville, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 325 days.

(21) Appl. No.: 17/647,879

(22) Filed: Jan. 13, 2022

(65) Prior Publication Data

US 2023/0224299 A1    Jul. 13, 2023

(51) Int. Cl.
*H04L 9/40* (2022.01)
*G16Y 30/10* (2020.01)

(52) U.S. Cl.
CPC .......... *H04L 63/0876* (2013.01); *H04L 63/10* (2013.01); *H04L 63/166* (2013.01); *G16Y 30/10* (2020.01)

(58) Field of Classification Search
CPC ... H04L 63/0876; H04L 63/10; H04L 63/166; H04L 63/0428; H04L 63/08; G16Y 30/10
See application file for complete search history.

(56) References Cited

U.S. PATENT DOCUMENTS

| | | | |
|---|---|---|---|
| 2018/0091506 A1* | 3/2018 | Chow | H04L 67/567 |
| 2021/0006418 A1* | 1/2021 | Wei | H04L 9/3247 |
| 2022/0244934 A1* | 8/2022 | Chen | G06F 11/3409 |

* cited by examiner

Primary Examiner — Khoi V Le

(57) ABSTRACT

A device may receive software installation packages that include unique device identifiers and unique security mechanisms associated with corresponding IoT devices and include an address for the device, and may store the software installation packages in a data structure. The device may receive, based on the address for the device and from an IoT device, connection data identifying a request to connect to the device and identifying a device identifier and a security mechanism associated with the IoT device, and may utilize an MQTT protocol to authenticate the connection data based on the device identifier, the security mechanism, and the software installation packages stored in the data structure. The device may identify the IoT device as active when the connection data is authenticated, and may enable, when the connection data is authenticated, the IoT device to publish data to the device or to subscribe to data from the device.

20 Claims, 10 Drawing Sheets

X509 Certificate Example

Certificate:
    Data:
        Version: 3 (0x2)
        Serial Number:
            29:92:d3:17:26:df:41:6c:28:f6:fd:1a:42:12:58:c6:80:8B:e2:17
    Signature Algorithm: sha256WithRSAEncryption
        Issuer: C=US, ST=State, L=Location, O=Carrier, OU=Company, CN=Company Primary Issuing CA
        Validity
            Not Before: Apr 24  16:04:45  2021 GMT
            Not After: Oct 24  16:04:42  2021 GMT
        Subject: C=US, ST=State, L=Location, O=Carrier, OU=IoT, CN=0F10330FA001
        Subject Public Key Info:
            Public Key Algorithm: rsaEncryption
            Public Key: (2048 bits)
            Modulus:
                00:ab:f3:67:4e:33:00:38:58:77:cf:58:ac:09:db:
                ***
            Exponent: 65537 (0x10001)
        X509v3 extensions:
            X509v3 Basis Constraints:
                CA: FALSE
            X509v3 Key Usage: critical
                Digital Signature
            X509v3 Extended Key Usage:
                TLS Web Client Authentication
            X509v3 Authority Key Identifier:
                keyID:CA:4D:40:67:B5:86:91:30:45:0D:CD:63:13:52:FC:0B:9A:C8:E1:61
            X509v3 Subject Key Identifier:
                28:D4:69:74:EB:11:06:C9:B8:E0:90:6E:BE:0C:2B:8E:5A:F0:22:0B
    ***

FIG. 1B

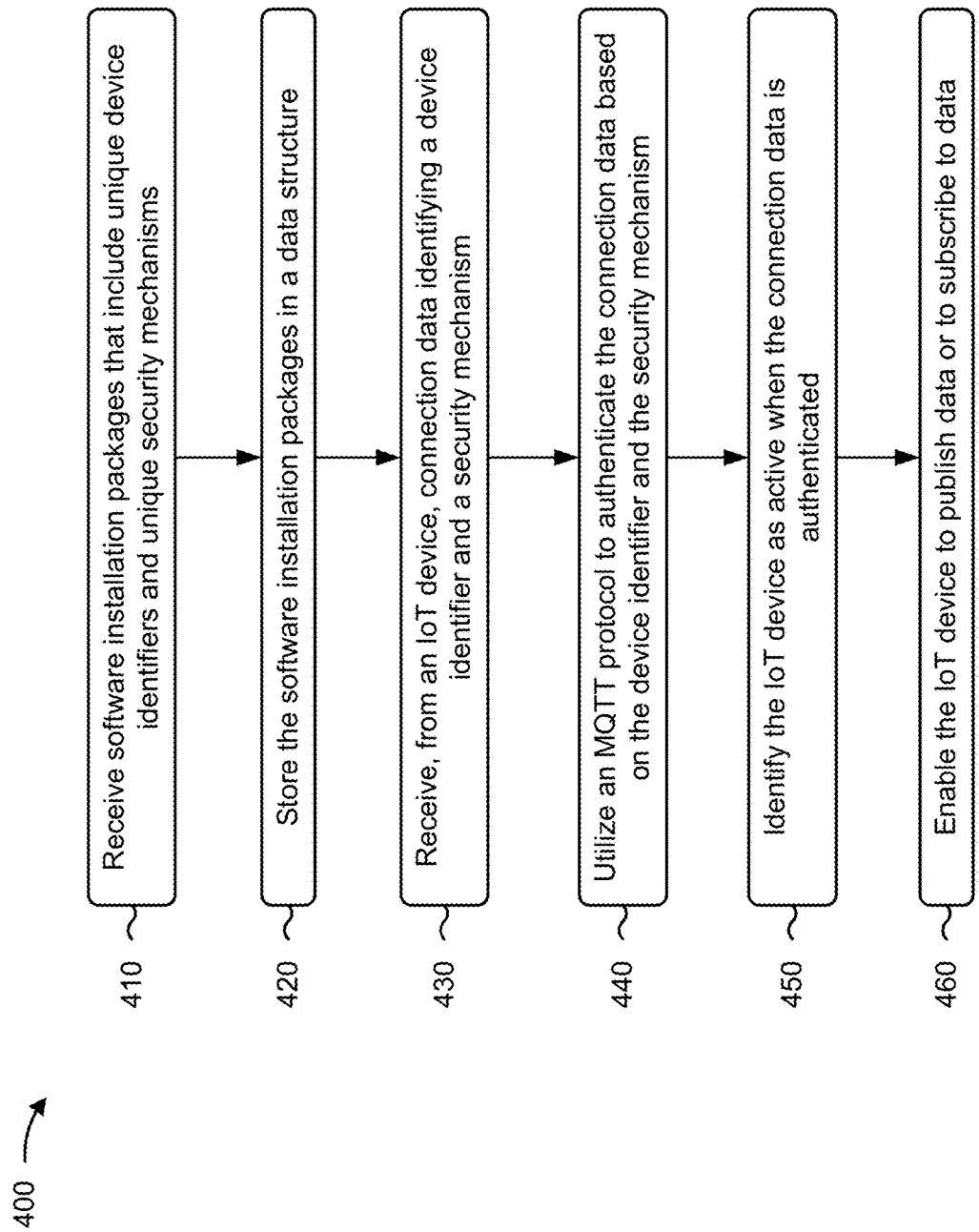

SYSTEMS AND METHODS FOR SECURE ONBOARDING AND COMMUNICATION FOR INTERNET OF THINGS DEVICES

BACKGROUND

The Internet of things (IoT) describes a network of physical objects (e.g., devices, things, and/or the like) that are embedded with sensors, software, and other technologies for the purpose of connecting and exchanging data with other devices and systems over a network, such as the Internet.

BRIEF DESCRIPTION OF THE DRAWINGS

FIGS. 1A-1G are diagrams of an example associated with secure onboarding and communication for IoT devices.

FIG. 4 is a flowchart of an example process for secure onboarding and communication for IoT devices.

DETAILED DESCRIPTION OF PREFERRED EMBODIMENTS

Figure 1A:
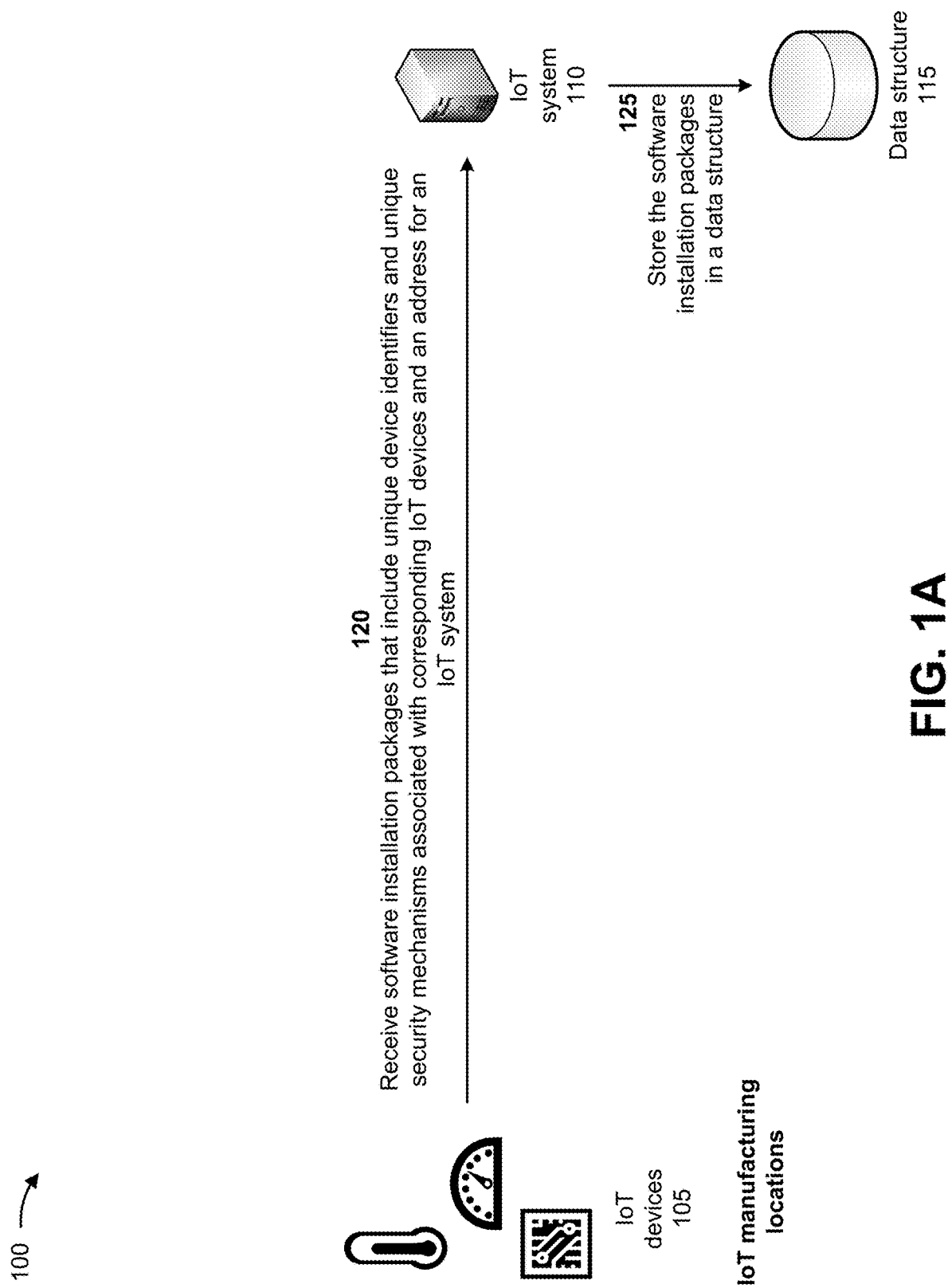

The following detailed description of example implementations refers to the accompanying drawings. The same reference numbers in different drawings may identify the same or similar elements.

IoT device management systems (e.g., IoT systems) experience various problems associated with onboarding and communicating with large quantities of IoT devices in a secure manner. For example, current IoT systems fail to provide a common and easy to use process for onboarding IoT devices, a process for automatically discovering IoT devices, a process for authenticating IoT devices and IoT device connections, and/or the like. In addition, current IoT systems fail to provide data access control for IoT devices and to prevent one IoT device from accessing data of allocated to another IoT device. Thus, current IoT systems consume computing resources (e.g., processing resources, memory resources, communication resources, and/or the like), networking resources, and/or other resources associated with onboarding unauthenticated IoT devices, exposing sensitive IoT data to security risks, handling security breaches associated with sensitive data, recovering sensitive data lost in security breaches, and/or the like.

Some implementations described herein provide an IoT system that provides secure onboarding and communication for IoT devices. For example, the IoT system may receive software installation packages that include unique device identifiers and unique security mechanisms associated with corresponding IoT devices and include an address for the IoT system, and may store the software installation packages in a data structure. The IoT system may receive, based on the address for the IoT system and from an IoT device, connection data identifying a request to connect to the IoT system and identifying a device identifier and a security mechanism associated with the IoT device, and may utilize a message queuing telemetry transport (MQTT) protocol to authenticate the connection data based on the device identifier, the security mechanism, and the software installation packages stored in the data structure. The IoT system may identify the IoT device as active when the connection data is authenticated, and may enable, when the connection data is authenticated, the IoT device to publish data to the IoT system or to subscribe to data from the IoT system.

In this way, the IoT system provides secure onboarding and communication for IoT devices. For example, the IoT system may enable IoT device manufacturers, IoT cloud platform providers, application owners, and/or the like to work together to deliver an overall solution of secure onboarding and communication for IoT devices. The IoT system may provide a quick and easy way to perform onboarding and automated discovery of IoT devices, and may provide for secure IoT device authentication and communication via an interface (e.g., an MQTT interface over transport layer security (TLS)). Thus, the IoT system may conserve computing resources, networking resources, and/or other resources that would have otherwise been consumed by onboarding unauthenticated IoT devices, exposing sensitive IoT data to security risks, handling security breaches associated with sensitive data, recovering sensitive data lost in security breaches, and/or the like.

FIGS. 1A-1G are diagrams of an example 100 associated with secure onboarding and communication for IoT devices. As shown in FIGS. 1A-1G, example 100 includes IoT devices 105 associated with an IoT system 110 and a data structure 115. Each of the IoT devices 105 may include a video camera, a meter, a sensor, a connected vehicle, a tracker, an alarm panel, a manufacturing control system, or a similar type of device. In one example, the IoT devices 105 may be manufactured at one or more manufacturing locations. The IoT system 110 may include a system that provides secure onboarding and communication for the IoT devices 105. The data structure 115 may include a database, a table, a list, and/or the like associated with the IoT system 110. Further details of the IoT devices 105, the IoT system 110, and the data structure 115 are provided elsewhere herein.

As shown in FIG. 1A, and by reference number 120, the IoT system 110 may receive software installation packages that include unique device identifiers and unique security mechanisms associated with corresponding IoT devices 105 and an address for the IoT system 110. For example, the IoT devices 105 may be manufactured at one or more manufacturing locations, and the manufacturers may generate the software installation packages that include the unique device identifiers and the unique security mechanisms associated with corresponding IoT devices 105 and the address for the IoT system 110. The manufacturers may install the software installation packages on the corresponding IoT devices 105, and may provide the software installation packages to the IoT system 110. The IoT system 110 may receive the software installation packages from the manufacturers.

The software installation packages may include software development kits. Each software development kit may include a collection of software development tools in one installable package and may facilitate creation of applications by having a compiler, debugger, and a software framework. Each software development kit may be unique to a corresponding one of the IoT devices 105 based on a unique device identifier associated with the corresponding one of the IoT devices 105.

Each of the unique device identifiers may include an international mobile equipment identity (IMEI), a media access control (MAC) address, a mobile directory number (MDN), a serial number, and/or the like of one of the IoT devices 105. Each of the unique security mechanisms may include a unique identifier generated based on an authority key identifier and one of the IMEI, the MAC address, the MDN, or the serial number of one of the IoT devices 105. In some implementations, each of the unique security mechanism may include a certificate, such as an X.509 certificate and a certificate identifier. An X.509 certificate is a digital certificate based on the International Telecommunications Union (ITU) X.509 standard, which defines a format of public key infrastructure (PKI) certificates. An X.509 certificate may be used to manage identity and security in Internet communications and computer networking. The address for the IoT system 110 may include a uniform resource locator (URL) of the IoT system 110 or of another IoT system to which the IoT devices 105 are to be connected.

As further shown in FIG. 1A, and by reference number 125, the IoT system 110 may store the software installation packages in the data structure 115. For example, the IoT system 110 may store the software installation packages in the data structure 115 associated with the IoT system 110. The data structure 115 may include a database, a table, a list, and/or the like that stores the software installation packages, the unique device identifiers, and/or the unique security mechanisms associated with the IoT devices 105.

FIG. 1B provides an example of an X.509 certificate. As shown, the X.509 certificate may include a data section that identifies a version and a serial number associated with an IoT device 105. The X.509 certificate may include a signature algorithm section that identifies an issuer of the X.509 certificate, a validity time period of the X.509 certificate, a subject of the X.509 certificate, a subject public key information of the X.509 certificate, X.509.3 extensions of the X.509 certificate, and/or the like. In some implementations, a serial number of the IoT device 105 and an authority key identifier may be utilized as a unique identifier of the X.509 certificate. This may guarantee the certificate identifier of the X.509 is unique across all certificate authorities, and may ensure that no two IoT devices 105 have the same certificate identifier in an inventory of the IoT system 110.

Figure 1C:
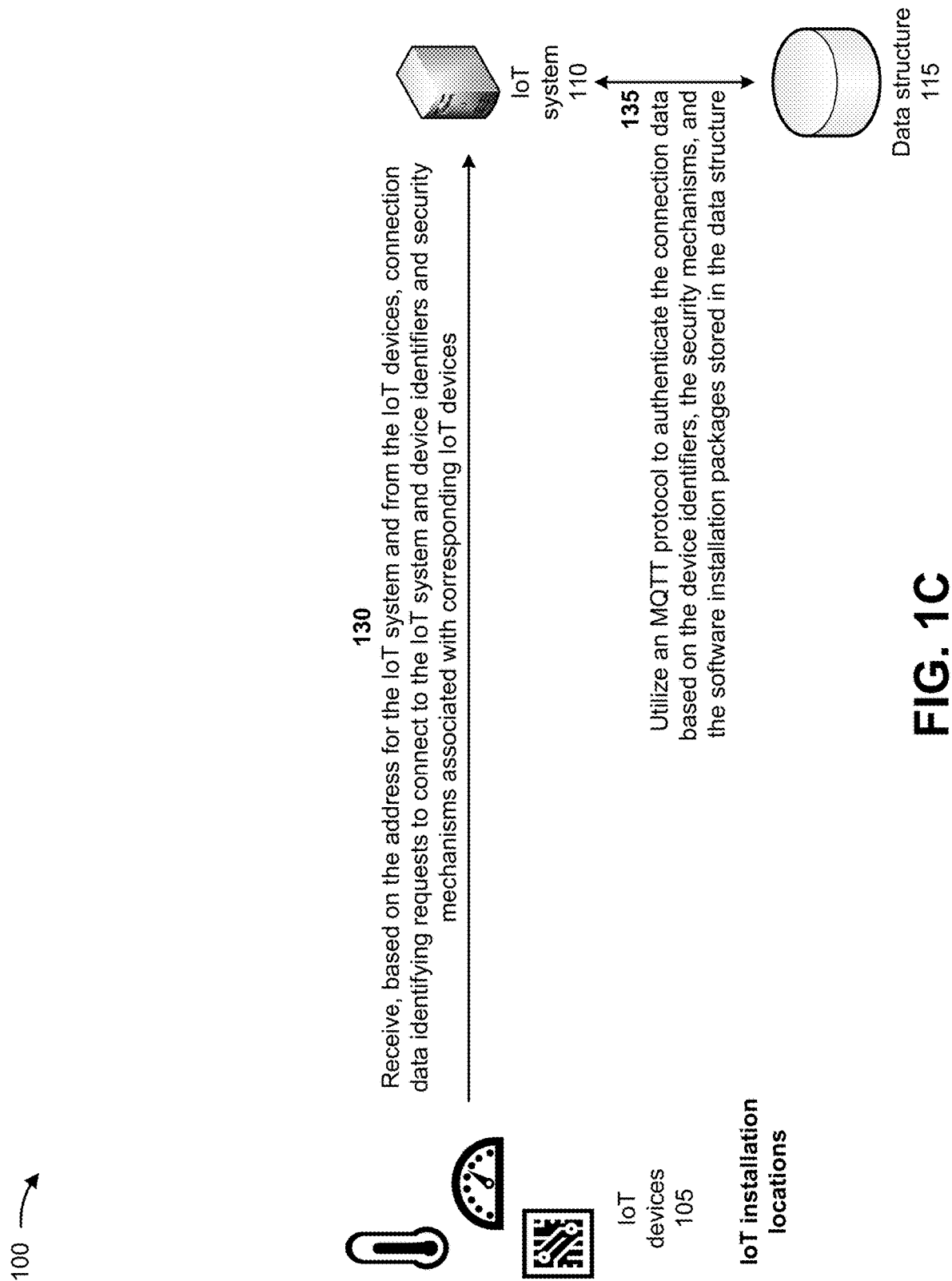

As shown in FIG. 1C, and by reference number 130, the IoT system 110 may receive, based on the address for the IoT system 110 and from the IoT devices 105, connection data identifying requests to connect to the IoT system 110 and device identifiers and security mechanisms associated with corresponding IoT devices 105. For example, the manufacturers may ship the IoT devices 105 to field or installation locations, such as stationary locations (e.g., buildings, machinery, and/or the like) or mobile locations (e.g., autonomous vehicles). When the IoT devices 105 are powered on, the IoT devices 105 may attempt to connect to the IoT system 110 via the address (e.g., URL) for the IoT system 110 provided in the software installation packages. For example, when the IoT devices 105 are powered on, the IoT devices 105 may execute software in the software installation packages to generate the connection data identifying the requests to connect to the IoT system 110 and identifying the device identifiers and the security mechanisms associated with corresponding IoT devices 105. The IoT devices 105 may provide the connection data to the IoT system 110 based on the address for the IoT system 110 indicated in the software installation packages. The IoT system 110 may receive the connection data from the IoT devices 105.

As further shown in FIG. 1C, and by reference number 135, the IoT system 110 may utilize a queuing protocol (e.g., an MQTT protocol) to authenticate the connection data based on the device identifiers, the security mechanisms, and the software installation packages stored in the data structure 115. For example, the IoT system 110 may utilize a support service (e.g., an MQTT support service) to authenticate the connection data based on the device identifiers, the security mechanisms, and the software installation packages stored in the data structure 115. The MQTT protocol is a lightweight, publish-subscribe network protocol that transports messages between devices. The MQTT protocol may run over any network protocol that provides ordered, lossless, bi-directional connections, such as the Transmission Control Protocol and the Internet Protocol (TCP/IP). The MQTT protocol may be utilized for connections with remote locations where resource constraints exist or network bandwidth is limited.

In some implementations, the IoT system 110 may authenticate the connection data associated with an IoT device 105 when the device identifier associated with the IoT device 105 matches one of the unique device identifiers stored in the data structure 115 and when the security mechanism associated with the IoT device 105 matches one of the unique security mechanisms stored in the data structure 115. In some implementations, the IoT system 110 may not authenticate the connection data associated with the IoT device 105 when the device identifier associated with the IoT device 105 fails to match one of the unique device identifiers stored in the data structure 115 and/or when the security mechanism associated with the IoT device 105 fails to match one of the unique security mechanisms stored in the data structure 115. Further details of how the IoT system 110 authenticates the connection data is described below in connection with FIG. 1E.

In some implementations, when utilizing the MQTT protocol to authenticate the connection data, the IoT system 110 may parse the connection and may extract the device identifier and the security mechanism from the parsed connection data. The IoT system 110 may compare the device identifier and the security mechanism to the unique device identifiers and the unique security mechanisms, respectively, of the software installation packages stored in the data structure 115. The IoT system 110 may authenticate the connection data when the device identifier and the security mechanism match one of the unique device identifiers and one of the unique security mechanisms, respectively. In some implementations, the IoT system 110 may not authenticate the connection data when the device identifier and the security mechanism fail to match one of the unique device identifiers and/or one of the unique security mechanisms, respectively.

Figure 1D:
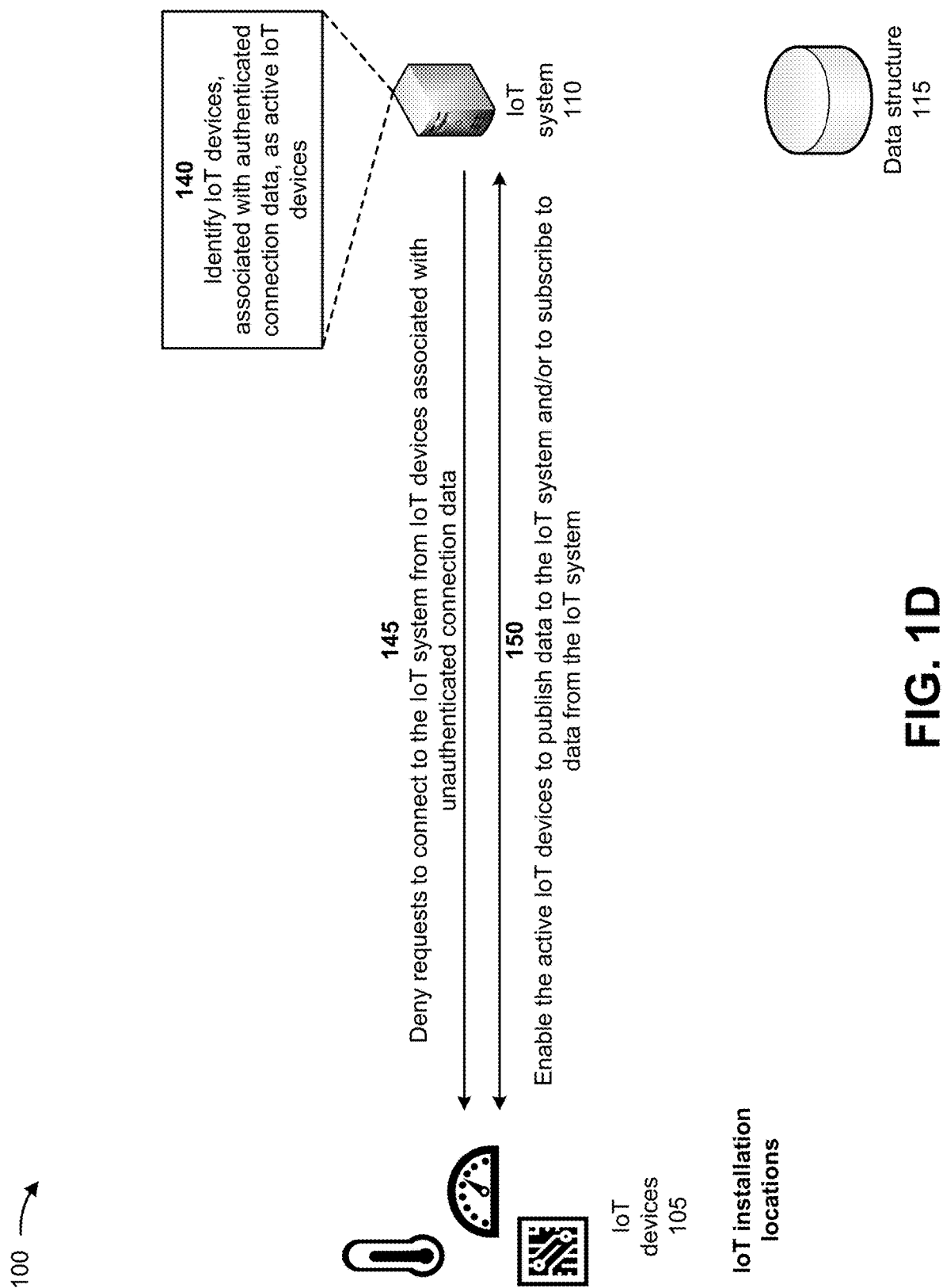

As shown in FIG. 1D, and by reference number 140, the IoT system 110 may identify IoT devices 105, associated with authenticated connection data, as active IoT devices 105. For example, the IoT system 110 may authenticate the connection data associated with particular IoT devices 105 when the device identifiers associated with particular the IoT devices 105 match one of the unique device identifiers stored in the data structure 115 and when the security mechanisms associated with the particular IoT devices 105 match one of the unique security mechanisms stored in the data structure 115. When the connection data associated with the particular IoT devices 105 are authenticated, the IoT system 110 may identify the particular IoT devices 105 as active and ready to securely send data to and receive data from the IoT system 110.

As further shown in FIG. 1D, and by reference number 145, the IoT system 110 may deny requests to connect to the IoT system 110 from IoT devices 105 associated with unauthenticated connection data. For example, the IoT system 110 may not authenticate the connection data associated with certain IoT devices 105 when the device identifiers associated with certain the IoT devices 105 fail to match one of the unique device identifiers stored in the data structure 115 and/or when the security mechanisms associated with the certain IoT devices 105 fail to match one of the unique security mechanisms stored in the data structure 115. When the connection data associated with the certain IoT devices 105 are unauthenticated, the IoT system 110 may deny requests to connect to the IoT system 110 from the certain IoT devices 105 associated with the unauthenticated connection data.

As further shown in FIG. 1D, and by reference number 150, the IoT system 110 may enable the active IoT devices 105 to publish data to the IoT system 110 and/or to subscribe to data from the IoT system 110. For example, the IoT system 110 may enable the IoT devices 105 identified as active IoT devices 105 to securely publish data to the IoT system 110 and/or to subscribe to data from the IoT system 110. In some implementations, an active IoT device 105 (e.g., a pressure sensor for a machine) may publish, to the IoT system 110, pressure data received by the active IoT device 105. The IoT system 110 may receive the pressure data and may store the pressure data. In some implementations, an active IoT device 105 (e.g., a control system for the machine) may subscribe to the pressure data (e.g., published by the pressure sensor) from the IoT system 110. The IoT system 110 provide the pressure data to the control system so that the control system may update machine parameters based on the pressure data. Further details of how the IoT system 110 enables the active IoT devices 105 to publish data to the IoT system 110 and/or to subscribe to data from the IoT system 110 is described below in connection with FIG. 1G.

Figure 1E:
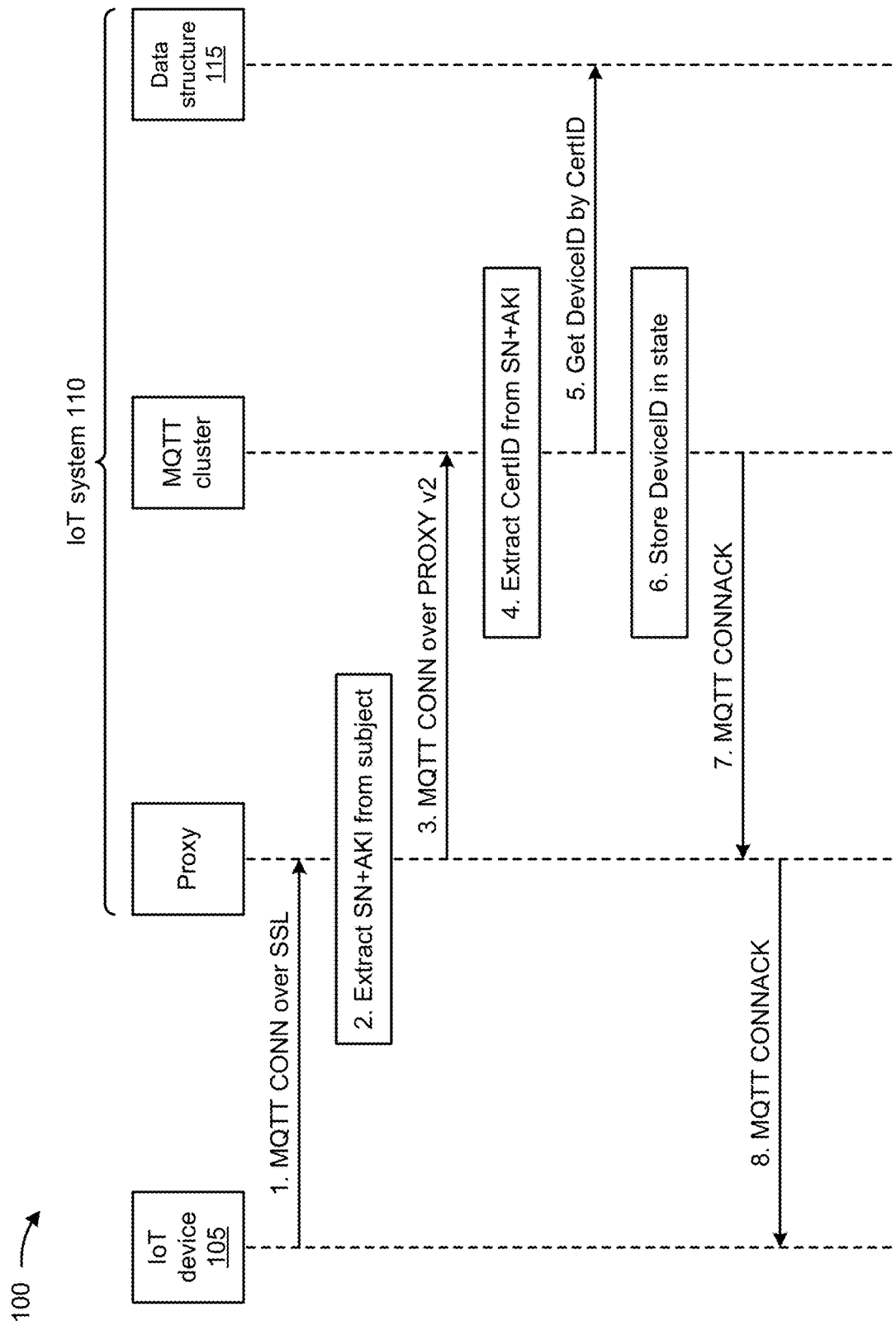

FIG. 1E is a diagram depicting how the IoT system 110 utilizes a queue protocol, such as the MQTT protocol to authenticate the connection data based on the device identifiers, the security mechanisms, and the software installation packages stored in the data structure 115. As shown, the IoT system 110 may include a proxy, an MQTT cluster or broker, and the data structure 115. The proxy may include a reverse-proxy offering high availability, load balancing, and proxying for TCP and Internet-based applications. The MQTT cluster may include a distributed system that represents one logical MQTT broker. The MQTT cluster may include many different MQTT brokers installed on different physical machines and connected over a network. In some implementations, the IoT system 110 may utilize any protocol that communicates an initial message that includes device identifiers (e.g., independent of device certificates), such as a transmission control protocol (TCP).

As shown at step 1 of FIG. 1E, the IoT device 105 may initiate an MQTT connection request (MQTT CONN) over a secure socket layer (SSL) with TLS. As this is an external connection, the connection data may be relayed via the proxy. As shown at step 2, the proxy may extract a device identifier (e.g., a serial number (SN)) and a security mechanism (e.g., an authority key identifier (AKI)) from the connection data.

As shown at step 3 of FIG. 1E, the proxy may relay the MQTT connection request, initiated by the IoT device 105, to the MQTT cluster using a proxy version 2 protocol. As part of the proxy version 2 protocol header, the serial number and the authority key identifier of the SSL certificate of the IoT device 105 is also relayed. When the proxy version 2 protocol header is received, the MQTT cluster may parse the proxy version 2 protocol header to generate a parsed proxy version 2 protocol header. As shown at step 4, the MQTT cluster may extract the serial number and the authority key identifier (e.g., referred to as a certificate identifier or CertID) from the parsed proxy version 2 protocol header.

As shown at step 5 of FIG. 1E, the MQTT cluster may utilize the extracted CertID to query the data structure 115 in order to obtain a device identifier (e.g., an IMEI, a MAC address, an MDN, and/or the like) associated with the CertID. As shown at step 6, the MQTT cluster may store the device identifier within the state information of a process that is currently handling the connection. Optionally, the MQTT cluster may compare a client identifier (e.g., provided in the MQTT connection request) with the device identifier identified in the data structure 115 based on CertID. If the MQTT cluster is unable locate the device identifier in the data structure 115, the MQTT cluster may not authenticate the connection data and may reject the MQTT connection request.

When the MQTT cluster authenticates the connection data and approves the MQTT connection data, the MQTT cluster generate an MQTT connection acknowledgement (e.g., MQTT CONNACK). As shown at step 7 of FIG. 1E, the MQTT cluster may provide the MQTT CONNACK to the proxy. As shown at step 8, the proxy may relay the MQTT CONNACK to the IoT device 105 that initiated the MQTT connection process. In some implementations, by using online certificate status protocol (OCSP), the IoT system 110 may perform additional checks of a device certificate to validate whether the certificate is expired or revoked (e.g., in a case where the certificate may be compromised). If a failure occurs during any of the aforementioned steps (e.g., due to malformed MQTT frames, nonexistent CertIDs, and/or the like), the IoT system 110 may deny the MQTT connection request.

Figure 1F:
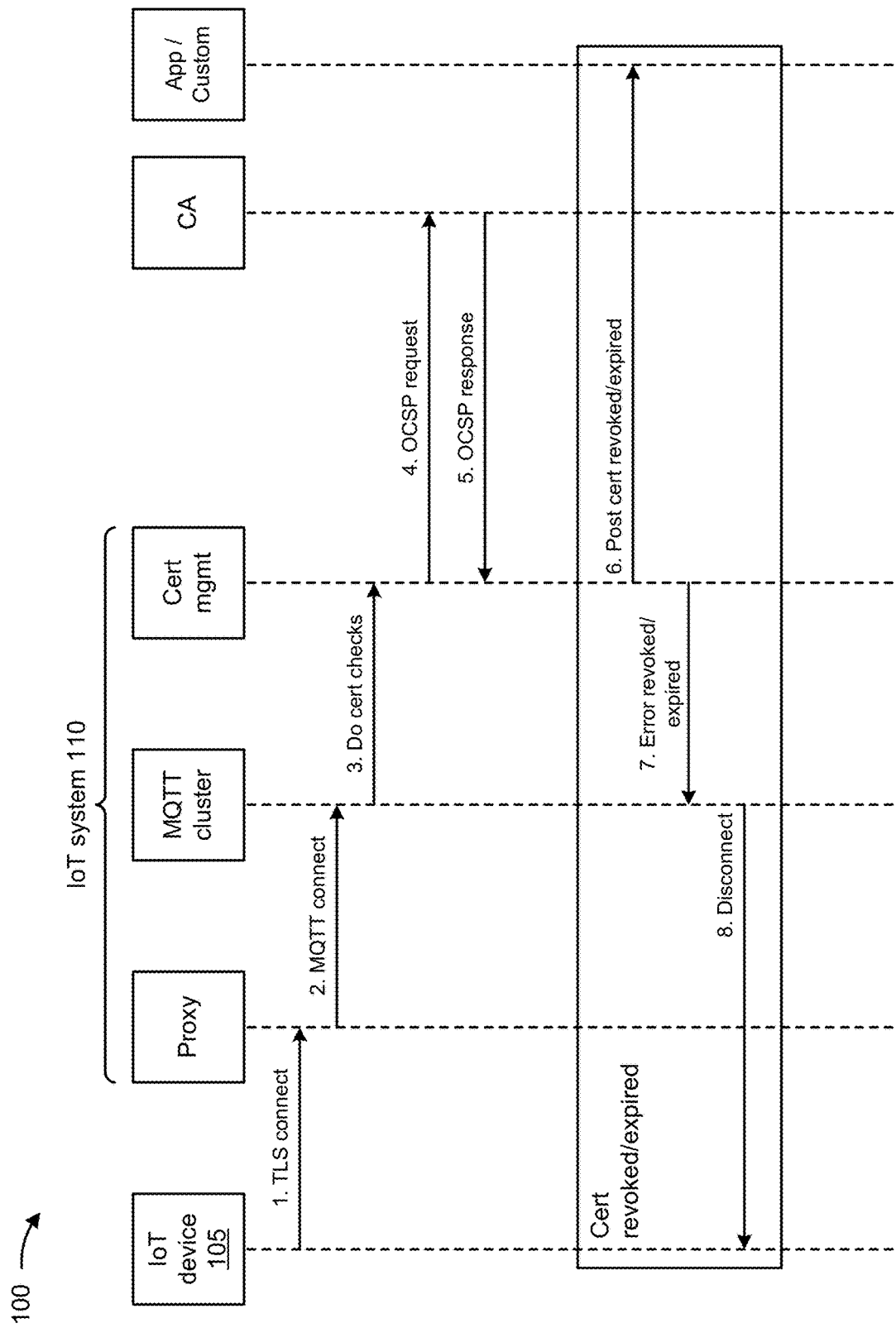

FIG. 1F is a diagram depicting how the IoT system 110 determines whether the security mechanism (e.g., a certificate) has been revoked or expired. As shown, the IoT system 110 may include the proxy and the MQTT cluster, described above, and may include a certificate management component. The certificate management component may communicate with a Certificate Authority (CA) to perform certificate validation. The certificate management component may be called by MQTT cluster upon connection to perform an OCSP certificate revocation check and to notify applications and/or customer devices.

As shown at step 1 of FIG. 1F, the proxy may receive a TLS-based connection request from an IoT device 105. The proxy may generate an MQTT connection request based on the TLS-based connection request. As shown at step 2, the proxy may provide the MQTT connection request to the MQTT cluster. Based on the MQTT connection request, the MQTT cluster may generate a certificate check requesting whether a certificate associated with IoT device 105 is revoked or expired. As shown at step 3, the MQTT cluster may provide the certificate check to the certificate management component.

The certificate management component may generate an OCSP request based on the certificate check. The OCSP request may include a request to determine whether the certificate is revoked or expired. As shown at step 4 of FIG. 1F, the certificate management component may provide the OCSP request to the certificate authority. The certificate authority may determine whether the certificate is valid, revoked, or expired based on the OCSP request. As shown at step 5, the certificate authority may provide, to the certificate management component, an OCSP response indicating whether the certificate is valid, revoked, or expired. If the certificate is valid the MQTT connection request may be approved (e.g., by the MQTT cluster).

As shown at step 6 of FIG. 1F, if the certificate is revoked or expired, the certificate management component may notify the applications and/or the customer devices that the certificate is revoked or expired. As shown at step 7, if the certificate is revoked or expired, the certificate management component may notify the MQTT cluster that the certificate is revoked or expired. As shown at step 8, the MQTT cluster may disconnect (e.g., deny the MQTT connection request) the IoT device 105 from the IoT system 110 when the certificate is revoked or expired.

Figure 1G:
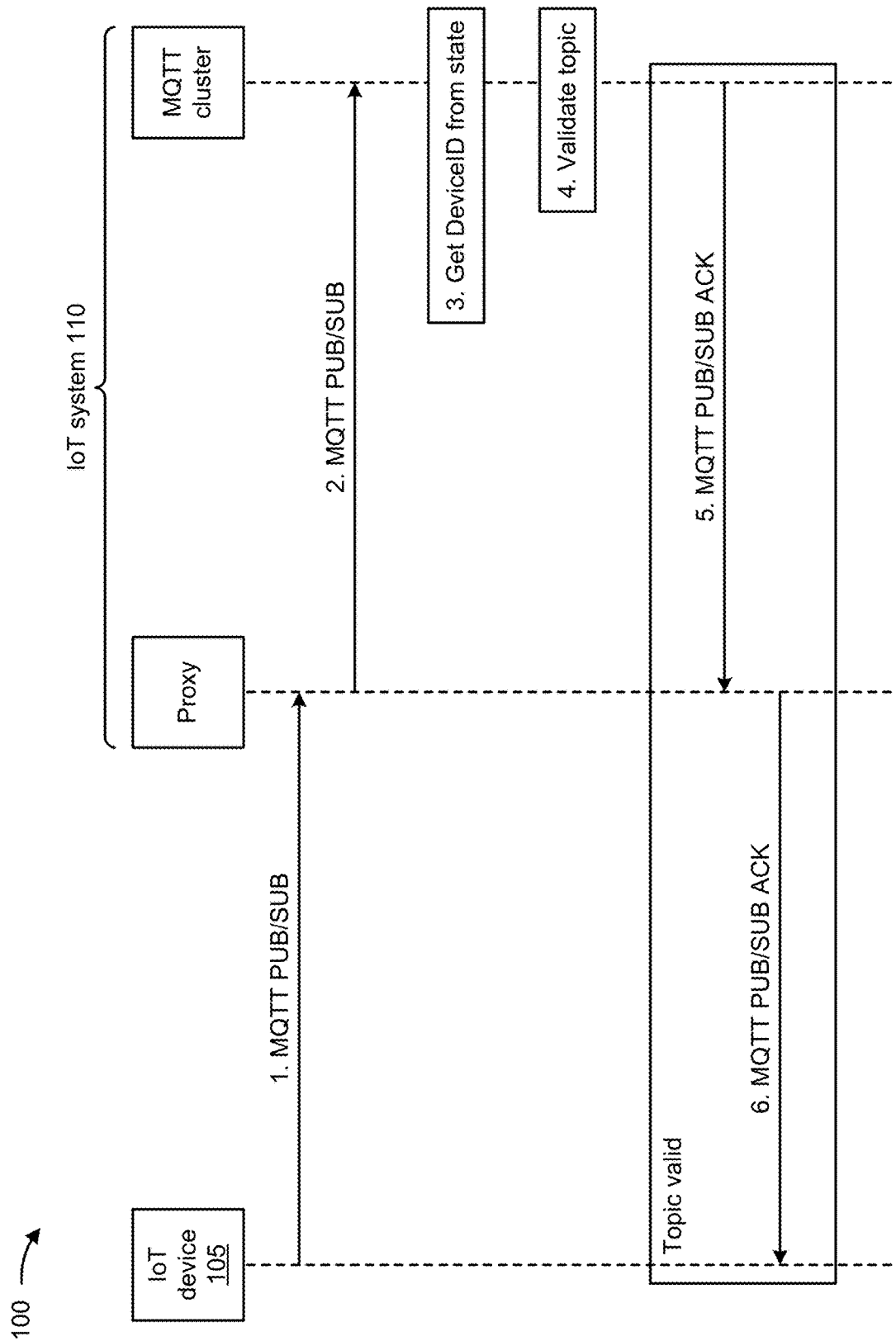

FIG. 1G is a diagram depicting how the IoT system 110 enables the active IoT devices 105 to publish data to the IoT system 110 and/or to subscribe to data from the IoT system 110. A successful MQTT connection may be established, between an IoT device 105 and the IoT system 110 before the IoT device 105 may publish data to the IoT system 110 and/or subscribe to data from the IoT system 110. As shown at step 1, the proxy may receive a publication or subscription request (e.g., an MQTT PUB/SUB request) from the IoT device 105. As shown at step 2, the proxy may relay the publication or subscription request to the MQTT cluster. The device identifier may be stored in the state information of the MQTT cluster process that is currently handling the existing connection. As shown at step 3, the MQTT cluster may retrieve the device identifier from the state information.

As shown at step 4 of FIG. 1G, the MQTT cluster may determine whether a topic of the publication or subscription request, sent by the IoT device 105, matches the device identifier retrieved from the state information. If the topic of the publication or subscription request matches the device identifier retrieved from the state information, MQTT cluster may determine that the topic is valid. If the topic of the publication or subscription request fails to match the device identifier retrieved from the state information, MQTT cluster may determine that the topic is invalid. If the topic is invalid, the MQTT cluster may deny the publication or subscription request.

If the topic is valid, the MQTT cluster may enable the publication or subscription request to be performed and may generate an acknowledgement (e.g., MQTT PUB/SUB ACK) indicating that the publication or subscription request is to be performed. As shown at steps 5 and 6 of FIG. 1G, the MQTT cluster may provide the acknowledgement to the proxy, and the proxy may relay the acknowledgement to the IoT device 105. If a failure occurs during any of the aforementioned steps (e.g., due to malformed MQTT frames, failure to validate the topic, and/or the like), the IoT system 110 may deny the publication or subscription request.

In this way, the IoT system 110 provides secure onboarding and communication for the IoT devices 105. For example, the IoT system 110 may enable IoT device manufacturers, IoT cloud platform providers, application owners, and/or the like to work together to deliver an overall solution of secure onboarding and communication for the IoT devices 105. The IoT system 110 may provide a quick and easy way to perform onboarding and automated discovery of the IoT devices 105, and may provide for secure IoT device authentication and communication via an interface (e.g., a MQTT interface over TLS). Thus, the IoT system 110 may conserve computing resources, networking resources, and/or other resources that would have otherwise been consumed by onboarding unauthenticated IoT devices 105, exposing sensitive IoT data to security risks, handling security breaches associated with sensitive data, recovering sensitive data lost in security breaches, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
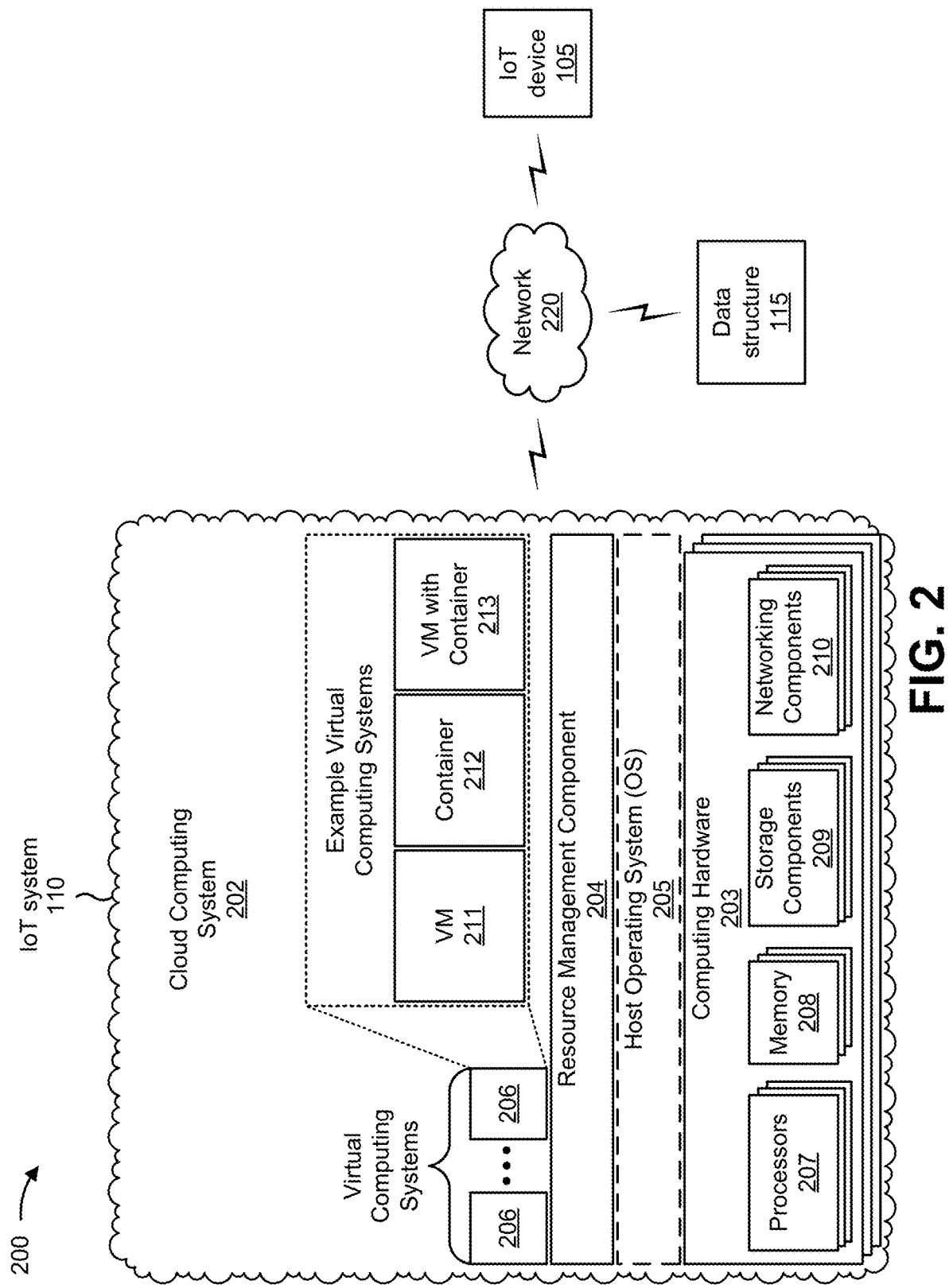
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include the IoT system 110, which may include one or more elements of and/or may execute within a cloud computing system 202. The cloud computing system 202 may include one or more elements 203-213, as described in more detail below. As further shown in FIG. 2, environment 200 may include the IoT device 105, the data structure 115, and/or a network 220. Devices and/or elements of environment 200 may interconnect via wired connections and/or wireless connections.

The IoT device 105 includes one or more devices capable of receiving, generating, storing, processing, and/or providing information, as described elsewhere herein. The IoT device 105 may include a communication device. For example, the IoT device 105 may include a wireless communication device, a mobile phone, a laptop computer, a tablet computer, a gaming console, a set-top box, a wearable communication device (e.g., a smart wristwatch, a pair of smart eyeglasses, a head mounted display, or a virtual reality headset), a video camera, a meter, a sensor, a connected vehicle, a tracker, an alarm panel, a manufacturing control system, or a similar type of device.

The data structure 115 includes one or more devices capable of receiving, generating, storing, processing, and/or providing information, as described elsewhere herein. The data structure 115 may include a communication device and/or a computing device. For example, the data structure 115 may include a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the data structure 115 may store the software installation packages, the unique device identifiers, and/or the unique security mechanisms associated with the IoT devices 105, as described elsewhere herein.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the IoT system 110 may include one or more elements 203-213 of the cloud computing system 202, may execute within the cloud computing system 202, and/or may be hosted within the cloud computing system 202, in some implementations, the IoT system 110 may not be cloud-based (e.g., may be implemented outside of a cloud computing system) or may be partially cloud-based. For example, the IoT system 110 may include one or more devices that are not part of the cloud computing system 202, such as the device 300 of FIG. 3, which may include a standalone server or another type of computing device. The IoT system 110 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
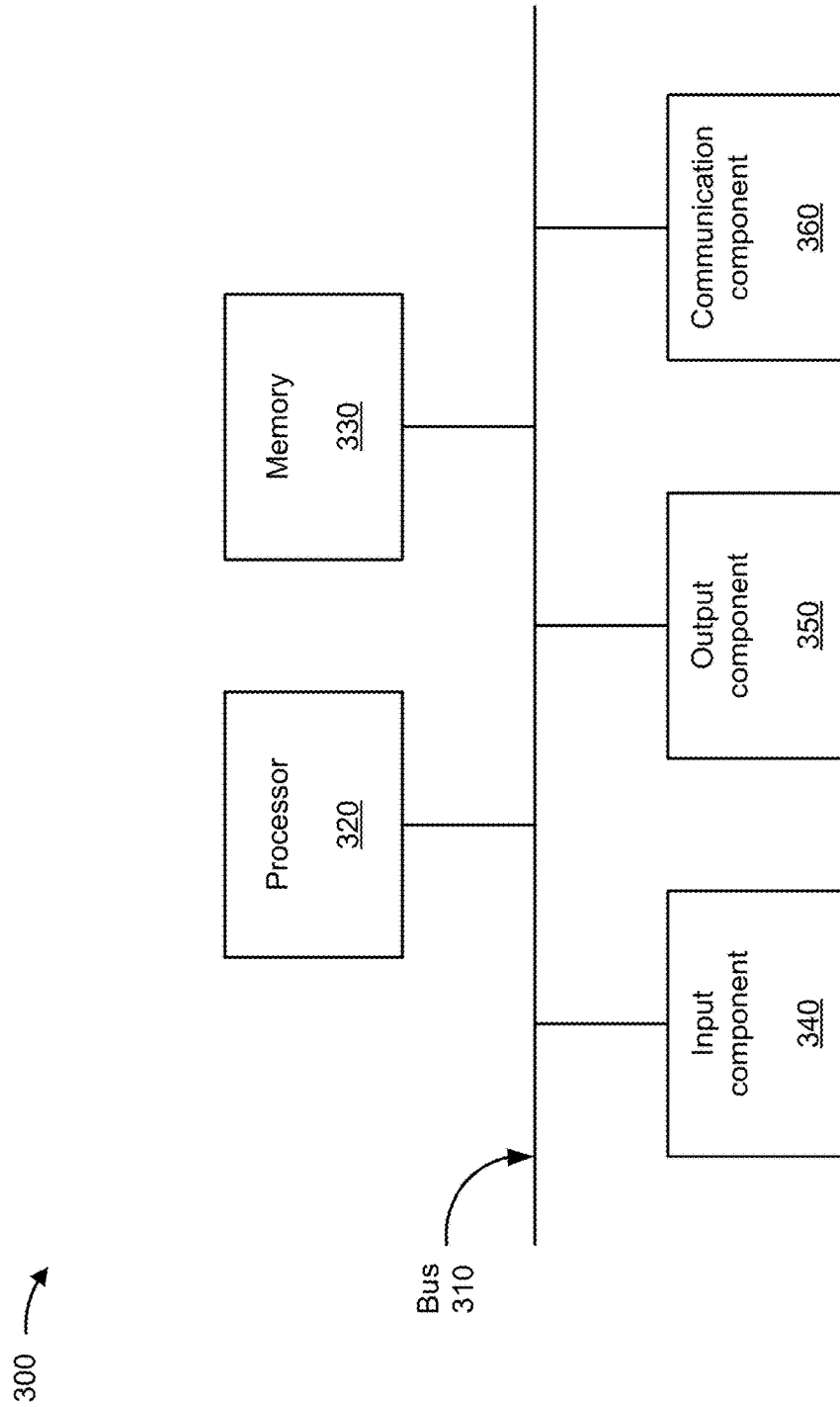
FIG. 3 is a diagram of example components of one or more devices of FIG. 3.

FIG. 3 is a diagram of example components of a device 300, which may correspond to the IoT device 105, the IoT system 110, and/or the data structure 115. In some implementations, the IoT device 105, the IoT system 110, and/or the data structure 115 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 for secure onboarding and communication for IoT devices. In some implementations, one or more process blocks of FIG. 4 may be performed by a device (e.g., the IoT system 110). In some implementations, one or more process blocks of FIG. 4 may be performed by another device or a group of devices separate from or including the device, such as an IoT device (e.g., the IoT device 105). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving software installation packages that include unique device identifiers and unique security mechanisms associated with corresponding IoT devices and include an address for the device (block 410). For example, the device may receive software installation packages that include unique device identifiers and unique security mechanisms associated with corresponding IoT devices and include an address for the device, as described above. In some implementations, each of the unique device identifiers includes a serial number of one of the IoT devices, and each of the unique security mechanisms includes a unique identifier generated based on the serial number and an authority key identifier. In some implementations, each of the unique device identifiers includes one or more of an international mobile equipment identity, a media access control address, a mobile directory number, or a serial number.

As further shown in FIG. 4, process 400 may include storing the software installation packages in a data structure (block 420). For example, the device may store the software installation packages in a data structure, as described above.

As further shown in FIG. 4, process 400 may include receiving based on the address for the device, and from an IoT device, connection data identifying a request to connect to the device and identifying a device identifier and a security mechanism associated with the IoT device (block 430). For example, the device may receive based on the address for the device, and from an IoT device, connection data identifying a request to connect to the device and identifying a device identifier and a security mechanism associated with the IoT device, as described above. In some implementations, the request to connect is received via a MQTT interface over transport layer security (TLS).

As further shown in FIG. 4, process 400 may include utilizing an MQTT protocol to authenticate the connection data based on the device identifier, the security mechanism, and the software installation packages stored in the data structure (block 440). For example, the device may utilize an MQTT protocol to authenticate the connection data based on the device identifier, the security mechanism, and the software installation packages stored in the data structure, as described above.

In some implementations, utilizing the MQTT protocol to authenticate the connection data based on the device identifier, the security mechanism, and the software installation packages stored in the data structure includes providing the connection data to an MQTT cluster; parsing the connection data to generate parsed connection data; extracting the device identifier and the security mechanism from the parsed connection data; comparing the device identifier and the security mechanism to the unique device identifiers and the unique security mechanisms, respectively, of the software installation packages stored in the data structure; and authenticating the connection data when the device identifier and the security mechanism match one of the unique device identifiers and one of the unique security mechanisms, respectively. In some implementations, process 400 includes not authenticating the connection data when the device identifier and the security mechanism fail to match one of the unique device identifiers and one of the unique security mechanisms, respectively.

As further shown in FIG. 4, process 400 may include identifying the IoT device as active when the connection data is authenticated (block 450). For example, the device may identify the IoT device as active when the connection data is authenticated, as described above.

As further shown in FIG. 4, process 400 may include enabling, when the connection data is authenticated, the IoT device to publish data to the device or to subscribe to data from the device (block 460). For example, the device may enable, when the connection data is authenticated, the IoT device to publish data to the device or to subscribe to data from the device, as described above.

In some implementations, process 400 includes denying the request to connect to the device when the connection data is unauthenticated.

In some implementations, process 400 includes determining whether the security mechanism is expired or revoked; identifying the IoT device as active when the connection data is authenticated and when the security mechanism is not expired or revoked; and enabling, when the connection data is authenticated and when the security mechanism is not expired or revoked, the IoT device to publish data to the device or to subscribe to data from the device. In some implementations, process 400 includes denying the request to connect to the device when the connection data is unauthenticated or when the security mechanism is expired or revoked.

In some implementations, process 400 includes receiving, from the IoT device, a request to publish a topic to the device; determining whether the topic includes the device identifier; and permitting the IoT device to publish the topic to the device when the topic includes the device identifier. In some implementations, process 400 includes canceling a connection between the IoT device and the device when the topic fails to include the device identifier.

In some implementations, process 400 includes receiving, from the IoT device, a request to subscribe to a topic from the device; determining whether the topic includes the device identifier; and permitting the IoT device to subscribe to the topic from the device when the topic includes the device identifier. In some implementations, process 400 includes canceling a connection between the IoT device and the device when the topic fails to include the device identifier.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a device, software installation packages that include unique device identifiers and unique security mechanisms associated with corresponding Internet of Things (IoT) devices and include an address for the device;
storing, by the device, the software installation packages in a data structure;
receiving, by the device, based on the address for the device, and from an IoT device, connection data identifying a request to connect to the device and identifying a device identifier and a security mechanism associated with the IoT device;
utilizing, by the device, a message queuing telemetry transport (MQTT) protocol to authenticate the connection data based on the device identifier, the security mechanism, and the software installation packages stored in the data structure,
wherein utilizing the MQTT protocol to authenticate the connection data based on the device identifier, the security mechanism, and the software installation packages stored in the data structure comprises:
extracting the device identifier or the security mechanism from the connection data, and
authenticating the connection data when the device identifier or the security mechanism match one of the unique device identifiers or one of the unique security mechanisms, respectively, of the software installation packages stored in the data structure;
identifying, by the device, the IoT device as active when the connection data is authenticated; and
enabling, by the device and when the connection data is authenticated, the IoT device to publish data to the device or to subscribe to data from the device.

2. The method of claim 1, further comprising:
denying the request to connect to the device when the connection data is unauthenticated.

3. The method of claim 1, wherein the request to connect is received via a MQTT interface over transport layer security (TLS).

4. The method of claim 1, wherein each of the unique device identifiers includes a serial number of one of the IoT devices, and each of the unique security mechanisms includes a unique identifier generated based on the serial number and an authority key identifier.

5. The method of claim 1, wherein each of the unique device identifiers includes one or more of:
an international mobile equipment identity,
a media access control address,
a mobile directory number, or
a serial number.

6. The method of claim 1, wherein utilizing the MQTT protocol to authenticate the connection data based on the device identifier, the security mechanism, and the software installation packages stored in the data structure comprises:
providing the connection data to an MQTT cluster; and
comparing, by the MQTT cluster, the device identifier or the security mechanism to the unique device identifiers and the unique security mechanisms, respectively, of the software installation packages stored in the data structure.

7. The method of claim 6, further comprising:
not authenticating the connection data when the device identifier and the security mechanism fail to match one of the unique device identifiers and one of the unique security mechanisms, respectively.

8. A device, comprising:
one or more processors configured to:
receive software installation packages that include unique device identifiers and unique security mechanisms associated with corresponding Internet of Things (IOT) devices and include an address for the device,
wherein the unique device identifiers include corresponding serial numbers of the IoT devices,
wherein the unique security mechanisms include corresponding unique identifiers generated based on the serial numbers and authority key identifiers;
store the software installation packages in a data structure;
receive, based on the address for the device and from an IoT device, connection data identifying a request to connect to the device and identifying a device identifier and a security mechanism associated with the IoT device;
utilize a message queuing telemetry transport (MQTT) protocol to authenticate the connection data based on the device identifier, the security mechanism, and the software installation packages stored in the data structure,
wherein the one more processors to utilize the MQTT protocol to authenticate the connection data based on the device identifier, the security mechanism, and the software installation packages stored in the data structure are configured to:
extract the device identifier or the security mechanism from the connection data, and
authenticate the connection data when the device identifier or the security mechanism match one of the unique device identifiers or one of the unique security mechanisms, respectively, of the software installation packages stored in the data structure;
identify the IoT device as active when the connection data is authenticated; and
enable, when the connection data is authenticated, the IoT device to publish data to the device or to subscribe to data from the device.

9. The device of claim 8, wherein the one or more processors are further configured to:
determine whether the security mechanism is expired or revoked;
identify the IoT device as active when the connection data is authenticated and when the security mechanism is not expired or revoked; and
enable, when the connection data is authenticated and when the security mechanism is not expired or revoked, the IoT device to publish data to the device or to subscribe to data from the device.

10. The device of claim 9, wherein the one or more processors are further configured to:
deny the request to connect to the device when the connection data is unauthenticated or when the security mechanism is expired or revoked.

11. The device of claim 8, wherein the one or more processors are further configured to:
receive, from the IoT device, a request to publish a topic to the device,
determine whether the topic includes the device identifier; and
permit the IoT device to publish the topic to the device when the topic includes the device identifier.

12. The device of claim 11, wherein the one or more processors are further configured to:
cancel a connection between the IoT device and the device when the topic fails to include the device identifier.

13. The device of claim 8, wherein the one or more processors are further configured to:
receive, from the IoT device, a request to subscribe to a topic from the device,
determine whether the topic includes the device identifier; and
permit the IoT device to subscribe to the topic from the device when the topic includes the device identifier.

14. The device of claim 13, wherein the one or more processors are further configured to:
cancel a connection between the IoT device and the device when the topic fails to include the device identifier.

15. A non-transitory computer-readable medium storing a set of instructions, the set of instructions comprising:
one or more instructions that, when executed by one or more processors of a device, cause the device to:
receive software installation packages that include unique device identifiers and unique security mechanisms associated with corresponding Internet of Things (IoT) devices and include an address for the device,
wherein each of the unique security mechanisms includes an X.509 certificate;
store the software installation packages in a data structure;
receive, based on the address for the device and from an IoT device, connection data identifying a request to connect to the device and identifying a device identifier and a security mechanism associated with the IoT device;
utilize a message queuing telemetry transport (MQTT) protocol to authenticate the connection data based on the device identifier, the security mechanism, and the software installation packages stored in the data structure,
  wherein the one or more instructions, that cause the device to utilize the MQTT protocol to authenticate the connection data based on the device identifier, the security mechanism, and the software installation packages stored in the data structure, cause the device to:
    extract the device identifier or the security mechanism from the connection data, and
    authenticate the connection data when the device identifier or the security mechanism match one of the unique device identifiers or one of the unique security mechanisms, respectively, of the software installation packages stored in the data structure;
  identify the IoT device as active when the connection data is authenticated; and
  enable, when the connection data is authenticated, the IoT device to publish data to the device or to subscribe to data from the device.

16. The non-transitory computer-readable medium of claim 15, wherein the one or more instructions further cause the device to:
  deny the request to connect to the device when the connection data is unauthenticated.

17. The non-transitory computer-readable medium of claim 15, wherein the one or more instructions, that cause the device to utilize the MQTT protocol to authenticate the connection data based on the device identifier, the security mechanism, and the software installation packages stored in the data structure, cause the device to:
  compare the device identifier or the security mechanism to the unique device identifiers or the unique security mechanisms of the software installation packages stored in the data structure.

18. The non-transitory computer-readable medium of claim 17, wherein the one or more instructions further cause the device to:
  not authenticate the connection data when the device identifier and the security mechanism fail to match one of the unique device identifiers and one of the unique security mechanisms, respectively.

19. The non-transitory computer-readable medium of claim 15, wherein the one or more instructions further cause the device to:
  determine whether the security mechanism is expired or revoked;
  identify the IoT device as active when the connection data is authenticated and when the security mechanism is not expired or revoked; and
  enable, when the connection data is authenticated and when the security mechanism is not expired or revoked, the IoT device to publish data to the device or to subscribe to data from the device.

20. The non-transitory computer-readable medium of claim 19, wherein the one or more instructions further cause the device to:
  deny the request to connect to the device when the connection data is unauthenticated or when the security mechanism is expired or revoked.

* * * * *